(12) United States Patent
Imanaka

(10) Patent No.: US 8,009,570 B2
(45) Date of Patent: Aug. 30, 2011

(54) ROUTER DEVICE FOR EFFICIENT ROUTING WITH CONGESTION MINIMIZED

(75) Inventor: Norihiro Imanaka, Nara (JP)

(73) Assignee: Oki Electric Industry Co. Ltd., Tokyo (JP)

( * ) Notice: Subject to any disclaimer, the term of this patent is extended or adjusted under 35 U.S.C. 154(b) by 155 days.

(21) Appl. No.: 12/453,859

(22) Filed: May 26, 2009

(65) Prior Publication Data
US 2009/0296725 A1    Dec. 3, 2009

(30) Foreign Application Priority Data

May 27, 2008    (JP) .................................. 2008-137841

(51) Int. Cl.
H04L 12/26    (2006.01)
H04L 12/28    (2006.01)
(52) U.S. Cl. ...................................... 370/237; 370/401
(58) Field of Classification Search .......... 370/229–235, 370/237, 238, 254, 255, 351, 392, 401, 412, 370/413, 415, 417
See application file for complete search history.

(56) References Cited

U.S. PATENT DOCUMENTS

| 7,633,940 | B1 * | 12/2009 | Singh et al. | 370/389 |
| 7,756,008 | B2 * | 7/2010 | Bellovin | 370/216 |
| 7,761,572 | B1 * | 7/2010 | Auerbach | 709/226 |
| 7,830,791 | B2 * | 11/2010 | Kulkarni | 370/229 |
| 2005/0141465 | A1 | 6/2005 | Kato et al. | |
| 2007/0274219 | A1 * | 11/2007 | Kulkarni | 370/238 |
| 2008/0056126 | A1 * | 3/2008 | Park et al. | 370/230 |

FOREIGN PATENT DOCUMENTS

| JP | 2004-172698 A | 6/2004 |
| JP | 2005-1874727 A | 7/2005 |

OTHER PUBLICATIONS

Zhen Yi Chen et al., "Effects of network structure and routing strategy on network capacity", Physical Review E, 73, 036107, 2006. The American Physical Society.

* cited by examiner

Primary Examiner — Hong Cho
(74) Attorney, Agent, or Firm — Rabin & Berdo, P.C.

(57) ABSTRACT

In a router, a receiver receives a communication packet meant for a communication destination other than this router device. A calculator calculates a cost value for forwarding a communication packet to a destination by each of neighboring routers adjacent to the router. A next-router determiner selects a neighboring router as a next router based on the cost value calculated to supply the determined information and the communication packet to a transmitter, which transmits the communication packet to the destination based on the determined information. The calculator calculates the cost value based on the node degree of the neighboring routers and the number of hops of the communication packet from the neighboring routers to the destination.

6 Claims, 9 Drawing Sheets

FIG. 5A

| NODE DEGREE | | |
|---|---|---|
| R1:5 | R2:3 | R3:2 | R4:7 |

| NUMBER OF HOPS | |
|---|---|
| R1 | 192.168.0.1 ..... | 9 |
| R3 | 192.168.0.1 ..... | 11 |
| R4 | 192.168.0.1 ..... | 7 |
| | | |

FIG. 5B

| NODE DEGREE | | | | |
|---|---|---|---|---|
| R1:5 | R2:4 | R3:2 | R4:7 | R5:10 |

| NUMBER OF HOPS | |
|---|---|
| R1 | 192.168.0.1 ..... | 9 |
| R3 | 192.168.0.1 ..... | 11 |
| R4 | 192.168.0.1 ..... | 7 |
| R5 | 192.168.0.1 ..... | 3 |

FIG. 8A

| QUEUE LENGTH | | | | | | |
|---|---|---|---|---|---|---|
| R1:6 | R2:5 | R3:9 | R4:2 | R5:7 | | |
| PARAMETER | | α:0.87 | | | | |
| | NUMBER OF HOPS | | | | | |
| R1 | 192.168.0.1 | ..... | 9 | | | |
| R3 | 192.168.0.1 | ..... | 3 | | | |
| R4 | 192.168.0.1 | ..... | 10 | | | |
| R5 | 192.168.0.1 | ..... | 7 | | | |

FIG. 8B

| QUEUE LENGTH | | | | | | |
|---|---|---|---|---|---|---|
| R1:6 | R2:5 | R3:9 | R4:8 | R5:7 | | |
| PARAMETER | | α:0.56 | | | | |
| | NUMBER OF HOPS | | | | | |
| R1 | 192.168.0.1 | ..... | 9 | | | |
| R3 | 192.168.0.1 | ..... | 3 | | | |
| R4 | 192.168.0.1 | ..... | 10 | | | |
| R5 | 192.168.0.1 | ..... | 7 | | | |

ROUTER DEVICE FOR EFFICIENT ROUTING WITH CONGESTION MINIMIZED

BACKGROUND OF THE INVENTION

1. Field of the Invention

The present invention relates to a router device for forwarding a communication packet.

2. Description of the Background Art

The total traffic volume that can be transferred over a telecommunications network is an indicator for measuring the performance of the network, and is important. In order to increase the total traffic volume, Zhen Yi Chen et al., "Effects of network structure and routing strategy on network capacity", PHYSICAL REVIEW E, 73, 036107, 2006, The American Physical Society, proposes a method for forwarding packets by a router. Zhen Yi Chen et al., proposes the method including consideration of the number of hops to a destination address and queue-waiting time. This can avoid congestion in routing. The steps for routing (1) and (2) will be described below.

(1) A router intending to forward a packet, when selecting a next router to which the packet is to be transmitted, calculates a weight $H_i$ for each neighboring router i through an expression (1) representing the cost incurred when the packet passes the node i, $$H_i = \alpha \frac{E_i}{\sum_{j \in g(i)} E_j} + (1-\alpha) \frac{L_i}{\sum_{j \in g(i)} L_j}, \quad 0 \le \alpha \le 1 \quad (1)$$

where g(i) is a set of neighboring routers of the router i, E(i) is the queue-waiting time of the router i, and L(i) is the number of hops from the router i to a destination address. When a packet passes the router i, the first term in the right-hand side of the expression (1) represents a temporal cost for processing the packet, and the second term represents a distance cost for sending the packet to its destination address.

(2) The router forwarding the packet selects a neighboring router having the minimum weight $H_i$ through the above expression (1) as a next router to forward the packet thereto. The account of the temporal cost thus taken can accomplish routing with a congested router requiring long time for processing the forwarded packet avoided.

According to these steps, compared with routing protocols such as RIP (Routing Information Protocol) or OSPF (Open Shortest Path First) for routing simply with the number of hops to a destination considered, the total traffic volume of a network can be increased.

The forwarding method described in Zhen Yi Chen et al., requires neighboring routers to be notified of the queue-waiting time. However, if all the neighboring routers are notified of the queue-waiting time by packets, they would have to process those packets to incur an increased load thereon, thus congesting the traffic on the network.

Moreover, the expression (1) also involves a matter of determination of the parameter α defining how much the ratio between the queue-waiting time and the number of hops is to be reflected on the weight $H_i$. Zhen Yi Chen et al., discloses that the value of parameter α maximizing the maximum value $\lambda_{crit}$ of the amount of packets which the router as a constituent element of a network is capable of generating per unit time depends upon the topology of the network. This means that since the value of parameter α maximizing the total traffic volume of a network is thus dependent upon the topology of the network, the determination of the optimum parameter α requires to learn the topology of the entire network in advance.

Well, although Zhen Yi Chen et al., teaches the parameter α maximizing the total traffic volume of a specific network topology, it is silent about how to determine the parameter α for an existing network. Therefore, in the case of applying a routing method with the parameter α fixed to an actual network, when it is taken into account that the value of parameter α maximizing the total traffic volume of the network is dependent on the topology of the network, the determination of the parameter α requires to know the topology of the entire network. However, such a method is not practical.

SUMMARY OF THE INVENTION

It is therefore an object of the present invention to provide a router device accomplishing efficient routing while avoiding congestion without sending packets notifying all neighboring routers of queue-waiting time.

In accordance with the present invention, a router device for forwarding a communication packet includes: a receiver for receiving the communication packet meant for a communication destination other than the device; a calculator for calculating a cost value for forwarding the communication packet meant for the destination by at least one neighboring router adjacent to the device for each of the at least one neighboring router; and a next-router determiner operative in response to the cost value for selecting one of the at least one neighboring router acting as a next router for the communication packet, the calculator using as parameters the node degree of the neighboring router and the number of hops from the neighboring router to the destination for the communication packet to calculate the cost value.

Further in accordance with the present invention, a router device for forwarding a communication packet includes: a receiver for receiving the communication packet meant for a communication destination other than the device; a calculator for calculating a cost value for forwarding the communication packet meant for the destination by at least one neighboring router adjacent to the device for each of the at least one neighboring router; and a next-router determiner operative in response to the cost value for selecting one of the at least one neighboring router acting as a next router for the communication packet, the calculator using as parameters a queue length of packet in the neighboring router and the number of hops from the neighboring router to the destination for the communication packet to calculate the cost value.

In a router device in accordance with the present invention, a receiver receives a communication packet meant for a communication destination other than this router device. A calculator calculates a cost value for forwarding the communication packet to the destination by each of neighboring routers adjacent to the router. A next-router determiner selects a neighboring router as a next router based on the cost value calculated to supply the determined information and the communication packet to a transmitter, which transmits the received communication packet to the destination based on the determined information. The calculator uses as two parameters the node degree of the neighboring router and the number of hops from the neighboring router to the destination for the communication packet to calculate the cost value. Thus, since the node degree having a frequency of change lower than that of the queue-waiting time is used to calculate the forwarding cost value, the router can reduce the load on itself when receiving the packet for notifying the node degree.

Further, in a router device in accordance with the present invention, a receiver receives a communication packet meant for a destination other than this router device. A calculator calculates a cost value for forwarding the communication packet to the destination by each of neighboring routers adjacent to the router. A next-router determiner selects one of the neighboring routers as a next router for the communication packet based on the cost value calculated to supply the determined information and the communication packet to a transmitter, which transmits the received communication packet to the destination based on the determined information. The calculator uses as two parameters a queue length of packet in the neighboring router and the number of hops from the neighboring router to the destination for the communication packet to calculate the cost value. Therefore, in order to determine a next router, the consideration of the node degree gives rise to avoiding a router tending to cause congestion, thus increasing the total traffic volume of the network.

BRIEF DESCRIPTION OF THE DRAWINGS

The objects and features of the present invention will become more apparent from consideration of the following detailed description taken in conjunction with the accompanying drawings in which:

FIG. 5A shows an example of information contained in a storage of the central router in the network shown in FIG. 4A;

FIG. 5B shows an example of information contained in the storage of the central router when another router is added and connected in the network shown in FIG. 4A;

FIG. 8A shows an example of information contained in a storage of the central router when the router shown in FIG. 6 is applied to the network shown in FIG. 4A; and FIG. 8B shows an example of information contained in the storage of the central router when another router is added and connected in the network having the router shown in FIG. 6 applied to the network shown in FIG. 4A.

DESCRIPTION OF THE PREFERRED EMBODIMENTS

Figure 1:
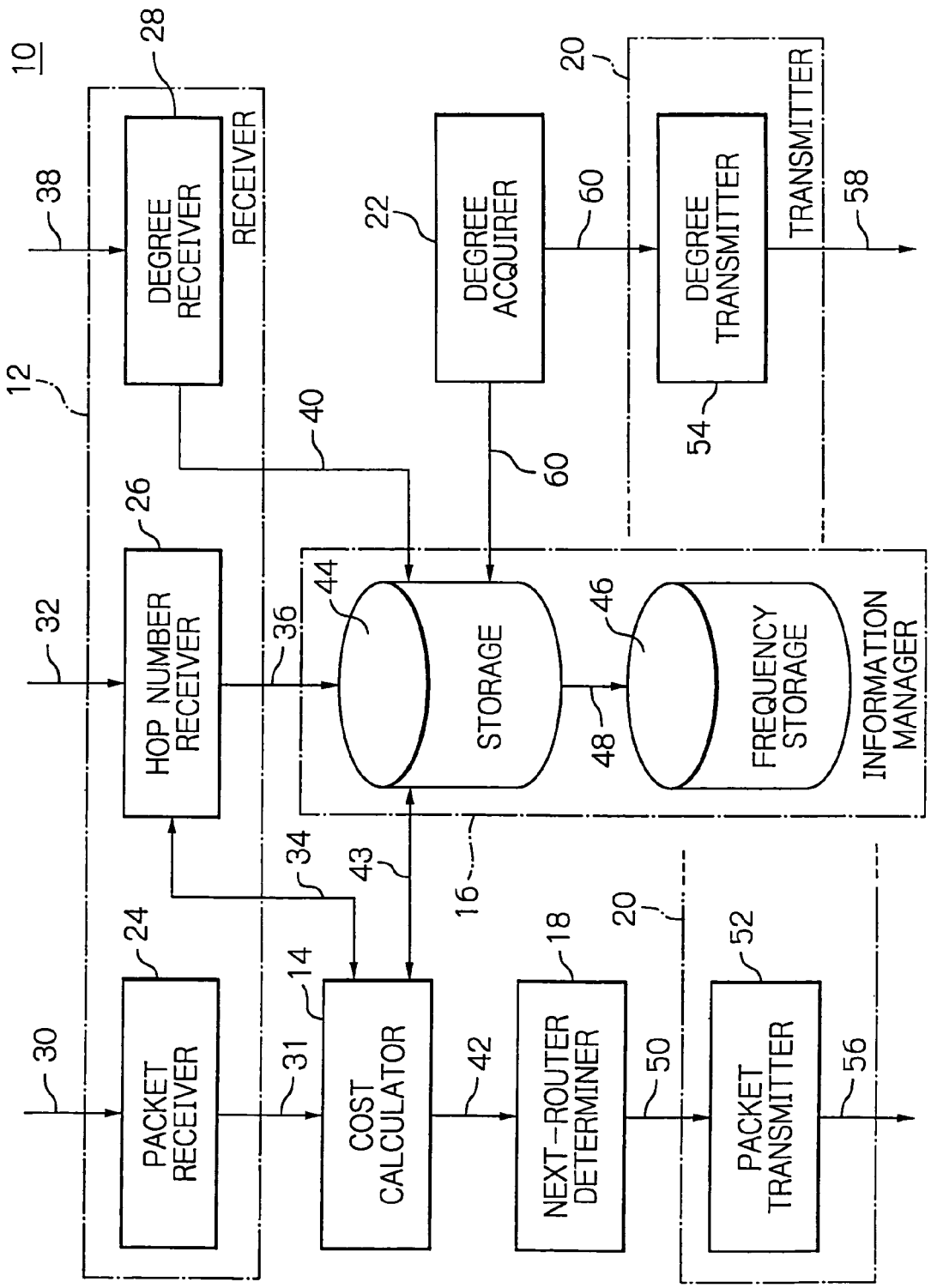
FIG. 1 is a schematic block diagram showing the configuration of an embodiment of a router to which a router device in accordance with the present invention is applied.

Well, reference will be made to accompanying drawings to describe in detail a router device in accordance with preferred embodiments of the present invention. With reference to FIG. 1, in a router 10 in accordance with an illustrative embodiment of the invention, a receiver 12 receives a communication packet 30 meant for a communication destination other than this router device 10, a cost calculator 14 calculates a cost value required when each of one or more neighboring routers, not shown, adjacent to the router 10 forwards the packet as a communication packet 31 to the destination, a next-router determiner 18 selects one of the neighboring routers as a next router based on the cost value 42 calculated by the cost calculator 14 to supply the determined information 50 and the communication packet 31 to a packet transmitter 52 adapted for receiving the determined information 50 and the communication packet 31 to transmit them, and the packet transmitter 52 transmits the packet as a communication packet 56 to the destination based on the determined information 50. The cost calculator 14 also calculates the cost value 42 based on the node degree of the neighboring routers and the number of hops of a communication packet from the neighboring routers to the destination. The router 10 thus uses the node degree which is lower in frequency of change than the queue-waiting time to calculate the forwarding cost value, thereby reducing the load on the router 10 having received a packet for notification of the node degree.

Elements or portions not directly relevant to understanding the present invention will neither be described nor shown. Like components are designated with the same reference numerals. In the description, signals are designated with reference numerals for connection lines on which they appear.

As shown in FIG. 1, the router 10 has the receiver 12, the cost calculator 14, an information manager 16, the next-router determiner 18, a transmitter 20, and a degree acquirer 22, which are interconnected as illustrated.

The receiver 12 has a function to receive various pieces of information, which may be in the form of packets, from its neighboring routers. As shown in FIG. 1, the receiver 12 includes a packet receiver 24, a hop number receiver 26, and a degree receiver 28 interconnected as depicted. The packet receiver 24 has a function to receive information in the form of packets from the exterior. The packet receiver 24 receives a packet 30 from neighboring routers, and transfers the received packet 30 as a packet 31 to the cost calculator 14. Now, the neighboring router is defined as an adjacent router on a telecommunications network which includes the router 10. Although not shown, the packet 31 is also supplied to the packet transmitter 52.

The hop number receiver 26 has a function to acquire the address and the number of hops for destination candidates as information from the exterior. The address may be an IP (Internet Protocol) address. Specifically, the hop number receiver 26 utilizes the advertisement of routing protocols such as RIP (Routing Information Protocol) or OSPF (Open Shortest Path First) to receive the address and the number of hops 32 required to the address for destination candidates to which a packet is to be forwarded with respect to each neighboring router to thereby acquire them. The hop number receiver 26 also receives from the cost calculator 14 a request 34 for acquiring the number of hops from a neighboring router to an address. In the context, the term address may be comprehended specifically as a router having that IP address as well as the value of address per se, of course. The hop number receiver 26 requests that neighboring router for an advertisement, and acquires the number of hops to the requested address according to the advertisement of the routing protocol. The hop number receiver 26 transfers the acquired information as pieces of information 36 and 34 to a storage in the information manager 16 and the cost calculator 14, respectively.

In the context, the advertisement means a sort of message used in routing protocols such as RIP and OSPF and including information about an address and the number of hops to the address. The request means an asking for transmitting an advertisement.

The degree receiver 28 has a function to receive the node degree as information from the exterior. The node degree in the context means the number of routers neighboring on a router of interest, such as router 10. The degree receiver 28 receives from any neighboring router a notification of the node degree 38 of that neighboring router, and transfers the received node degree 40 to the information manager 16.

The cost calculator 14 has a function to calculate a cost value $H_i$ for each of the neighboring routers. The cost value $H_i$ represents a cost required for a neighboring router i to forward a packet to a destination and calculated through an expression (2) described below. The cost value $H_i$ will be described below further in detail. The cost calculator 14 transfers the resulting cost values 43 and 42 to the information manager 16 and the next-router determiner 18, respectively.

The information manager 16 has a function to hold and manage information. The information manager 16 includes the storage 44 and a frequency storage 46, and may preferably be implemented by a rewritable storage device such as an HDD (Hard Disk Drive). The storage 44 and the frequency storage 46 may be configured into one unit.

The storage 44 has a function to hold information about the node degrees of the router 10 and all the routers adjacent to the router 10 on the network, and the numbers of hops from neighboring routers to a destination address. The storage 44 receives and holds the cost value 43 from the cost calculator 14. In the storage 44, a count is incremented each time the cost calculator 14 references the information about the number of hops contained in the storage 44 to represent a reference frequency, which will be transferred to the frequency storage 46 in the form of count value 48 associated with the information about the number of hops.

In the frequency storage 46, a count is incremented each time the cost calculator 14 references the information about the number of hops contained in the storage 44 to represent a resulting reference frequency, which is managed in the storage 46. Usage of this reference frequency will be described below in detail.

The next-router determiner 18 has a function to be responsive to a cost value to select one of the neighboring routers as the destination to which the packet received by the packet receiver 24 is to be forwarded. The next-router determiner 18 finds out one of the neighboring routers which is minimum in cost value calculated by the cost calculator 14, and selects that neighboring router as a next router for the packet received by the packet receiver 24. The next-router determiner 18 delivers forwarding information 50 representing the selected next router to the transmitter 20.

The transmitter 20 includes the packet transmitter 52 and a degree transmitter 54 interconnected as illustrated. The packet transmitter 52 serves as forwarding the packet 31 provided by the packet receiver 24 as a packet 56 toward the neighboring router as its next router selected by the next-router determiner 18. The degree transmitter 54 functions as notifying, only when the node degree of the router 10 is changed, or updated, the degree receiver of the neighboring routers of the updated node degree 58 of the router 10.

The degree acquirer 22 has a function to acquire the number of routers adjacent to the router 10, i.e. node degree. The degree acquirer 22 transfers the acquired node degree 60 to the storage 44 and the degree transmitter 54.

The packet receiver 24, the cost calculator 14, the next-router determiner 18, the packet transmitter 52, the hop number receiver 26, the degree receiver 28, the degree acquirer 22 and the degree transmitter 54 in the router 10 may be implemented in the form of hardware such as circuit devices having their functions, or alternatively or additionally in the form of functional blocks configured by arithmetic devices such as a microcomputer, or a processor system including a CPU (Central Processing Unit) controlled by software defining its operation. The packet receiver 24, the packet transmitter 52, the hop number receiver 26, the degree receiver 28 and the degree transmitter 54 may include appropriate network interfaces. The network interfaces may be shared between these functional units.

Next, it will be described how the cost calculator 14 calculates the cost value $H_i$ for a neighboring router i. (1) Acquisition of the node degree and the number of hops The cost calculator 14 first refers to the storage 44 to acquire the node degree of a neighboring router and the number of hops from the neighboring router to a forwarding address to which a packet 30 received by the packet receiver 24 is to be forwarded. That procedure is made for each of the neighboring routers except for a previous router, i.e. a router having originated that packet. The previous router is excluded in order to prevent the received packet from being returned to itself.

If information about the number of hops cannot be acquired with reference to the storage 44, then the router 10 requests the hop number receiver 26 to acquire missing information about the number of hops. When the hop number receiver 26 acquires missing information about the number of hops for a neighboring router, it supplies the information to the cost calculator 14.

(2) Calculation of the Cost Value $H_i$

The cost calculator 14 acquires the information about the node degrees and the numbers of hops for all the neighboring routers, and then calculates the cost value $H_i$ for each neighboring router i through an expression (2):

$$H_i = \alpha \frac{N_i}{\sum_{j \in g(s)} N_j} + (1-\alpha) \frac{L_i}{\sum_{j \in g(s)} L_j}, 0 \leq \alpha \leq 1 \tag{2}$$

where g(s) is the set of neighboring routers of a router s except a previous router, N(i) is the node degree of a router i, and L(i) is the number of hops from a router i to a forwarding address. A parameter $\alpha$ in the expression (2) is constant, and is preliminarily determined as an optimum value by, for example, a simulation. A "coefficient" in this embodiment corresponds to the parameter $\alpha$ in the expression (2).

Figure 2A:
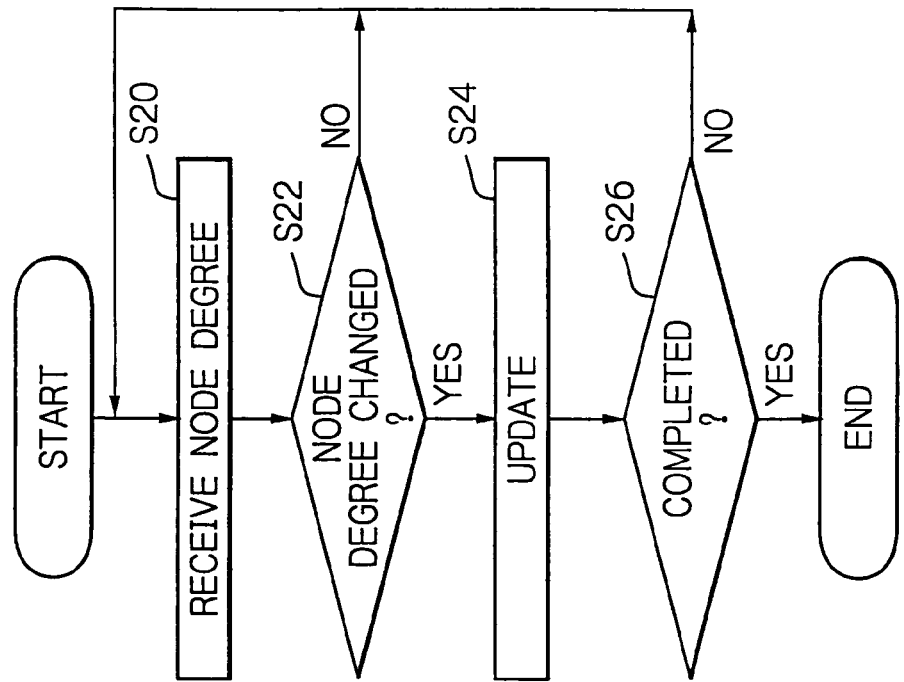
FIG. 2A is a flowchart useful for understanding a procedure of operation that the router shown in FIG. 1 acquires the node degree of the own router.
Figure 2B:
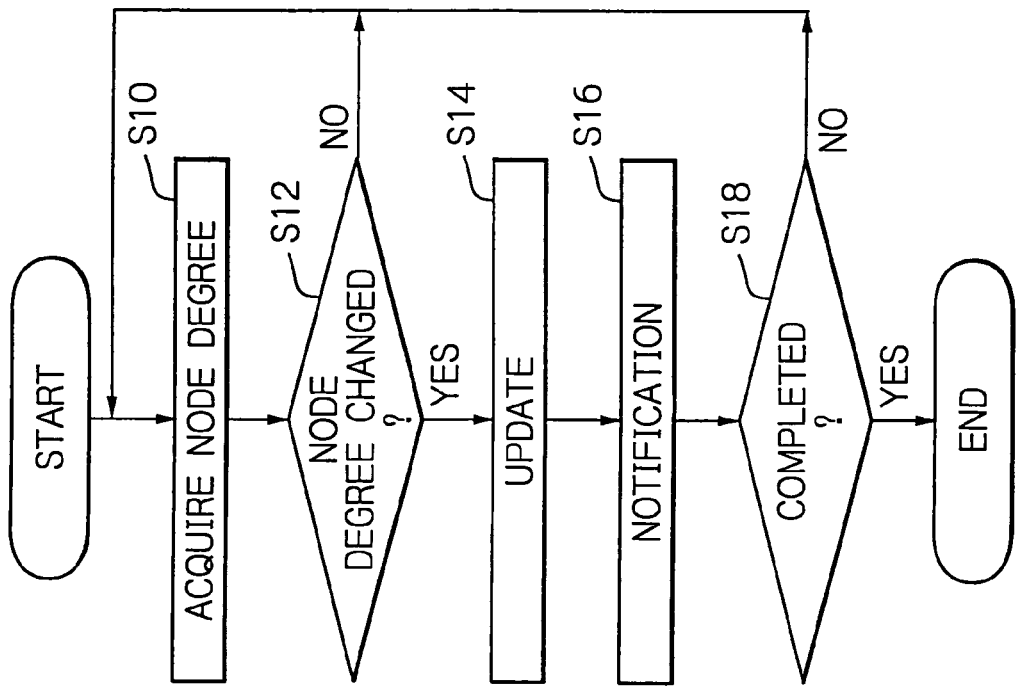
FIG. 2B is a flowchart useful for understanding a procedure of operation that the router shown in FIG. 1 acquires the node degree of neighboring routers.

Next, reference will be made to FIGS. 2A and 2B to describe the operation on the node degree in the router 10. FIG. 2A shows how the router 10 acquires the node degree of the own router 10, while FIG. 2B shows how the router 10 acquires the node degrees of its neighboring routers.

(a) The Node Degree of the Own Router

The degree acquirer 22 acquires the node degree of the own router 10 (step S10). Specifically, the degree acquirer 22 determines whether or not communication route information exists between the own router 10 and the neighboring routers. This algorithm enables the degree acquirer 22 to count the number of neighboring routers to acquire the node degree of the own router 10.

Next, the degree acquirer 22 confirms whether or not the newly acquired node degree is changed to be different from the preceding node degree of the own router 10 contained in the storage 44 (step S12). When the node degree is determined as changed according to the difference (YES), the step progresses to an updating step S14 for the node degree. Otherwise, namely, when the node degree is not determined as changed (NO), the step returns to the acquisition step S10 for the node degree.

In step S14, the degree acquirer 22 supplies the acquired node degree 60 to the storage 44, and the router 10 updates the preceding node degree of the own router 10 contained in the storage 44 with the new node degree 60. The degree acquirer 22 feeds the updated value to the degree transmitter 54. In turn, the degree transmitter 54 notifies all the neighboring routers of the updated node degree 60 of the own router 10 received from the degree acquirer 22 (step S16).

Next, it is determined whether or not the acquisition process for the node degree has been completed (step S18). When the acquisition process for the node degree is to be continued (NO), the step returns to the acquisition step S10 for the node degree. Otherwise, namely, when the acquisition process for the node degree has been completed (YES), the acquiring steps for node degree in the own router 10 are finished.

(b) The Node Degree of the Neighboring Router

The degree receiver 28 receives a notification of the node degree 38 from the neighboring router (step S20).

Next, the degree receiver 28 confirms whether or not the acquired node degree 38 is changed to be different from the preceding node degree of the own router 10 contained in the storage 44 (step S22). When the node degree is changed (YES), the step progresses to an updating step S24 for the node degree. Otherwise, namely, when the node degree is not changed (NO), the step returns to the receiving step S20 for the node degree. The degree receiver 28 supplies the node degree 40 to the storage 44. The storage 44 updates the contained node degree of the neighboring router with the new node degree 40 (step S24).

Next, it is determined whether or not the acquisition process for the node degree to be completed (step S26). When the acquisition process for the node degree is to be continued (NO), the step returns to the receiving step S20 for the node degree. Otherwise, namely, when the acquisition process for the node degree is to be completed (YES), the reception of node degree in the own router 10 is finished.

Now, with reference to FIGS. 3A and 3B, it will be described how the router 10 acquires information about the number of hops from neighboring routers to a forwarding address. The hop number receiver 26 acquires information about a forwarding address and the number of hops required through a neighboring router to the forwarding address from an advertisement announced from the neighboring router through routing protocols such as RIP and OSPF (step S30).

Next, the hop number receiver 26 confirms whether or not the acquired forwarding address is registered in the item entries associated with the neighboring router contained in the storage 44 (step S32). When the forwarding address is registered (YES), the step progresses to a change-determining step S34 for the number of hops. Otherwise, namely, when the forwarding address is not registered (NO), the step progresses to a step S36 for determining a free area available for registration.

The hop number receiver 26 confirms whether or not the preceding number of hops is changed in the item entries associated with the neighboring router contained in the storage 44 based on the number of hops required to the confirmed address (step S34). When the number of hops is changed (YES), the control progresses to an update step S38. Otherwise, namely, when the number of hops is not changed (NO), the control returns to the step S30s for acquiring information.

The hop number receiver 26 supplies the storage 44 with the number of hops as acquired information 36. In the storage 44, the preceding number of hops in the item entries associated with that neighboring router contained in the storage 44 is updated with the number of hops 36 required to the confirmed address (step S38). The hop number receiver 26 also updates the use frequency of the item entries associated with the neighboring router in the frequency storage 46.

In the determining step S36 for a free area available for the registration, the hop number receiver 26 confirms whether or not a free area exists in a registration area of the storage 44. When a free area exists (YES), the control proceeds to an update step S40. Otherwise, namely, when any free area does not exist (NO), the step progresses through a connector A to a step S42, FIG. 3B, for determining the existence of an address not referred to.

The hop number receiver 26 supplies the information 36 to the storage 44. In the storage 44, a new item entry associated with the neighboring router having received an advertisement is produced, and in the entity the information 36 on the acquired number of hops is stored to thereby update information (step S40).

Figure 3A:
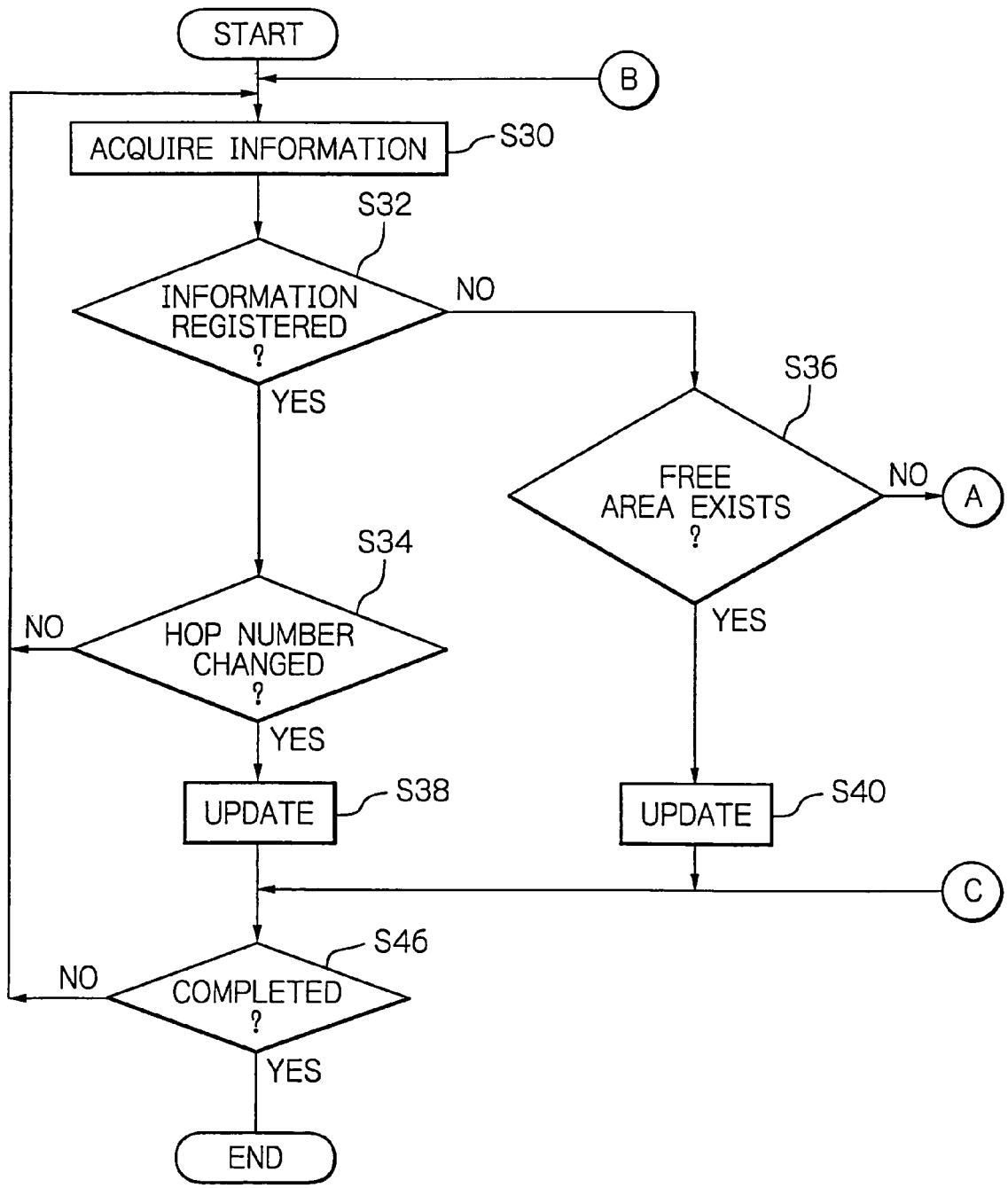
FIGS. 3A and 3B are a flowchart useful for understanding a procedure of operation that the router shown in FIG. 1 acquires information about the number of hops from the neighboring router to a destination address.
Figure 3B:
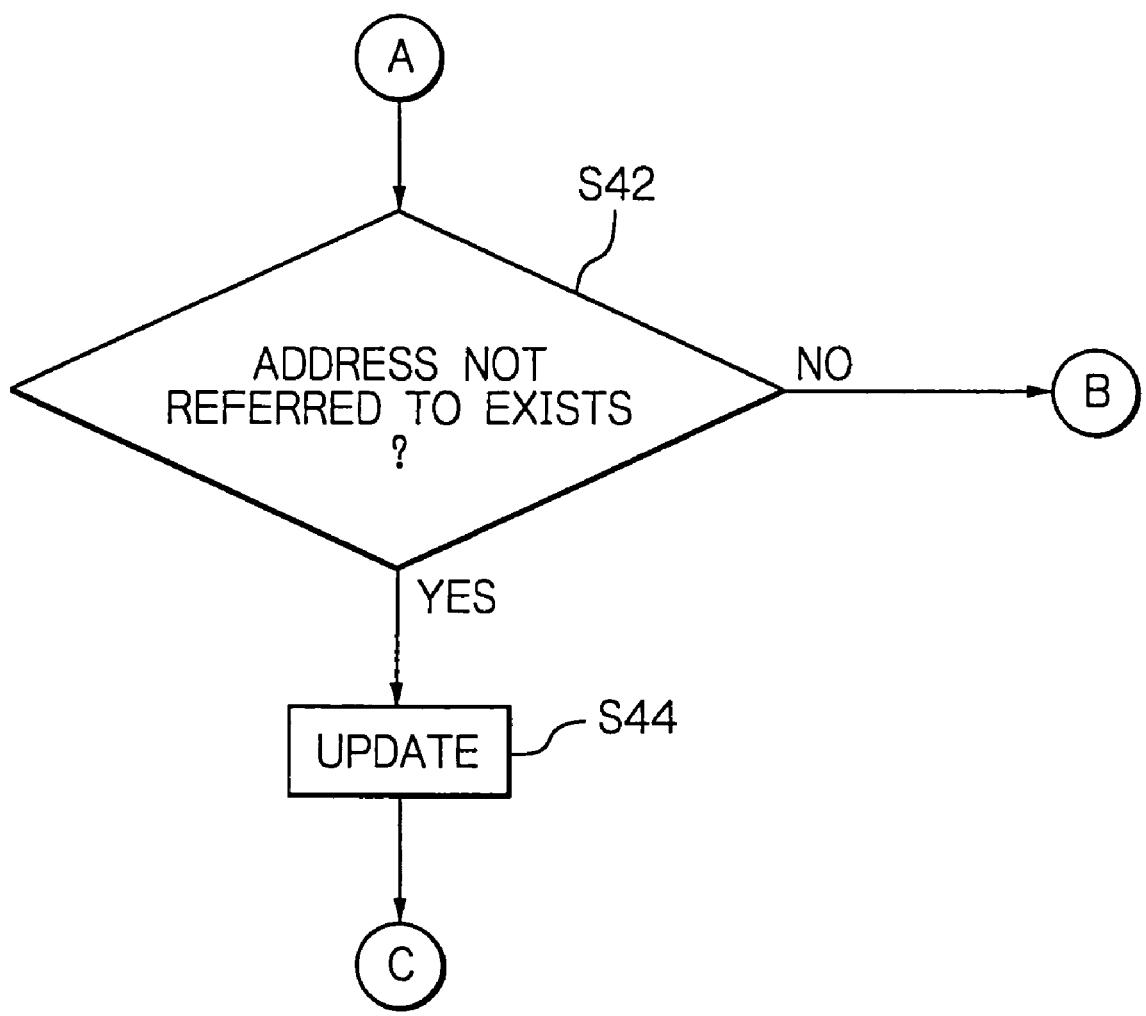

Next, the hop number receiver 26 refers to the frequency storage 46, as shown in FIG. 3B, to confirm whether or not the address which the cost calculator 14 does not use for the calculation for a predetermined period of time remains (step S42). When such an address remains (YES), the step progresses to an updating step S44. Otherwise, namely, when such an address does not remain (NO), the step returns through a connector B to the step S30, FIG. 3A, for acquiring information.

In the updating process S44, the hop number receiver 26 supplies the information 36 to the storage 44. The storage 44 deletes the item entry associated with the forwarding address referred to from the storage 44 to secure a registration area. Furthermore, the storage 44 newly produces the item entry of a neighboring router having received the advertisement, and newly registers the information 36 about the acquired forwarding address and number of hops.

After the preceding updating steps S38 and S40, the step progresses to a finish-determining step S46. After the updating step S44, the step progresses through a connector C to the finish-determining step S46 shown in FIG. 3A. The finish-determining step S46 determines whether or not the acquisition process for information about the number of hops is completed. When the acquisition process for the number of hops is to be continued (NO), the step returns to the step S30 for acquiring information about the number of hops. Otherwise, namely, when the acquisition process for information about the number of hops is completed (YES), the acquisition of information about the number of hops in the router 10 is finished.

Figure 4A:
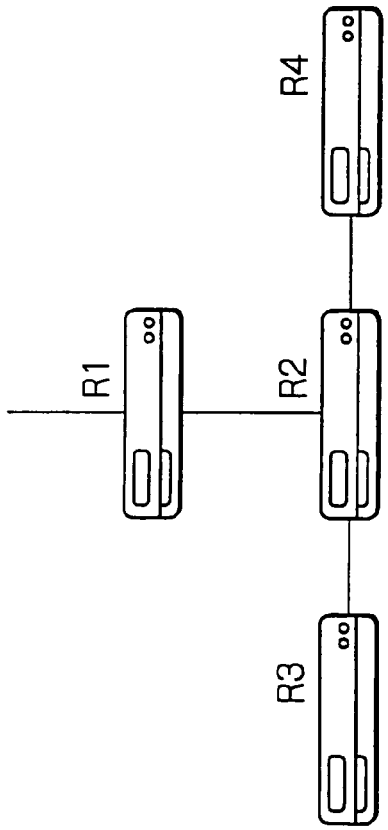
FIG. 4A shows the connection relationship of a network to which four routers shown in FIG. 1 are applied.
Figure 4B:
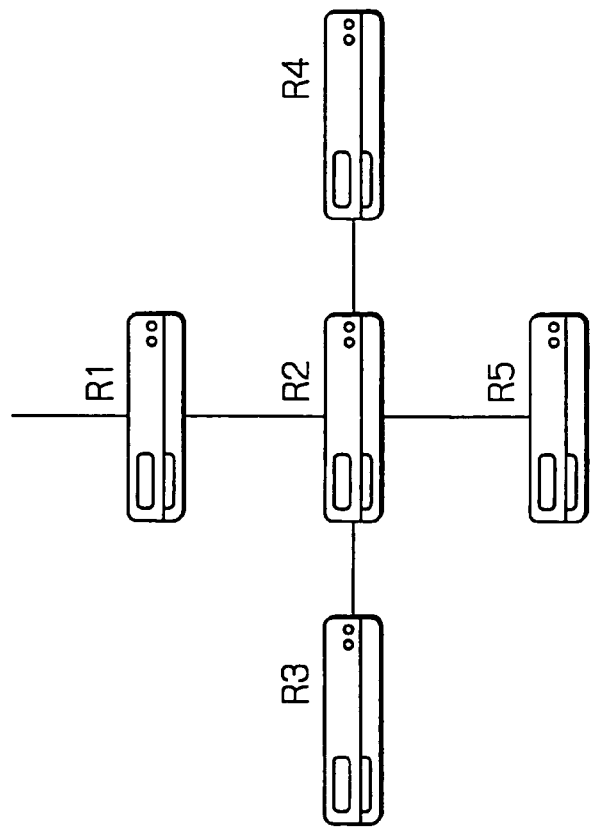
FIG. 4B shows a connection relationship such that one router is further added to the network shown in FIG. 4A.

Now, a more specific configuration of telecommunications network will be described in terms of a specific operation of the router 10 with reference to FIGS. 4A, 4B, 5A and 5B. This embodiment is exemplified as applicable to a network formed by routers R1 to R4 or R1 to R5 located with the router R2 centered. FIGS. 4A and 4B show the connections before and after the new router R5 is connected to the router R2, respectively. In connection states shown in FIGS. 4A and 4B, the storage 44 contains information in a table form as shown in FIGS. 5A and 5B, respectively. More specifically, the storage 44 contains the node degree of those routers in its node degree fields 62. The storage 44 also has a plurality of divided fields associated with the number of hops of the respective routers. Those fields are a router name field 64 for describing a router name, a forwarding address field 66 for describing a forwarding address, and a hop number field 68 for describing the number of hops for the forwarding address.

The node degree of the router R2 is equal to three before the router R5 is connected thereto as shown in FIG. 5A. After the router R5 is connected, the node degree of the router R2 is changed to four as shown in FIG. 5B. Similarly, after the router R5 is connected, the node degree of the router R5 is equal to ten including the router R2. Therefore, excluding the own router R2, nine neighboring routers are connected. As shown in FIG. 5B, the number of hops from the router R5 to an address "192.168.0.1" is equal to three.

After the router R5 is connected to the router R2, the contents of the storage 44 are updated according to the following steps (1) to (7). As a result, the contents of the storage 44 are updated from the state shown in FIG. 5A to the state shown in FIG. 5B.

(1) After the router R5 is connected to the router R2 in this network, the degree acquirer 22 in the router R2 acquires the node degree of the own router R2. This step corresponds to the acquisition step S10 shown in FIG. 2A for the node degree.

(2) The degree acquirer 22 in the router R2 updates data in an item "R2: 3" in the node degree field 62 shown in FIG. 5A to data in the item "R2: 4" shown in FIG. 5B according to the update step S14 shown in FIG. 2A.

(3) The degree transmitter 54 in the router R2 notifies all the neighboring routers R1, R3, R4 and R5 of the new node degree "4" as information 58 of the own router R2 according to the update process shown in FIG. 2A.

(4) The degree transmitter 54 in the router R5 notifies all the neighboring routers R1 to R4 of the new node degree "10" as information 58 of the own router R5 due to a change in the node degree of the own router R5 from nine to ten.

(5) The degree receiver 28 in the router R2 receives the node degree "10" of the router R5 according to the notification process and the finish-determining steps S16 and S18 shown in FIG. 2A. Due to no item entry associated with the router R5 in the node degree field 62 shown in FIG. 5A, the degree receiver 28 in the router R2 generates a new item entry "R5: 10" to register the generated item entry "R5: 10" in the storage 44.

(6) The hop number receiver 26 in the router R2, as shown in FIG. 2B, receives an advertisement by routing protocols such as RIP and OSPF from the router R5 (step S20). In this example, this advertisement describes that the number of hops to the address "192.168.0.1" is equal to three.

(7) The hop number receiver 26 in the router R2 updates the hop number field 68 shown in FIG. 5B according to the steps shown in FIGS. 3A and 3B. Thus, due to no item entry associated with the router R5 and to the existence of the free area in the state shown in FIG. 5A, the item entry associated with the router R5 is newly generated in the storage 44 to register the number of hops "3" to the address "192.168.0.1" in the storage 44.

Next, it will be described how the constituent elements operate when, over the network constructed as shown in FIGS. 4A and 4B by the routers connected, the router R2 receives a packet sent from the router R1 and meant for the address "192.168.0.1" and forwards the packet toward the address "192.168.0.1" in the following steps (8) to (11). It is assumed that the parameter α in the expression (2) is preliminarily set to an optimum value of 0.5 by a simulation.

(8) The packet receiver 24 in the router R2 receives the packet sent toward the address "192.168.0.1" by the router R1.

(9) The cost calculator 14 in the router R2 calculates the cost value $H_i$ of its neighboring routers, excluding the router R1 serving as a previous router, by the following steps.

(9.1) The cost calculator 14 acquires from the storage 44 the node degree and the number of hops to the address "192.168.0.1" of each neighboring router.

(9.2) The cost calculator 14 uses the expression (2) and the values 43 acquired from the storage 44 to calculate the cost value $H_i$ of the respective neighboring routers. Now, based on those values 43 shown in FIG. 5B, the cost values are determined as follows, for example.

(9.3) (Cost value $H_3$ of the router R3)=0.31

(9.4) (Cost value $H_4$ of the router R4)=0.35

(9.5) (Cost value $H_5$ of the router R5)=0.33

(10) The next-router determiner 18 in the router R2 uses the cost value 42 of those neighboring routers calculated by the cost calculator 14 to select a next router for the packet received from the router R1. In this embodiment, since the router R3 has the minimum cost value $H_3$ among the cost values $H_i$, the next-router determiner 18 in the router R2 selects the router R3 as the next router.

(11) The packet transmitter 52 forwards the packet 30 received from the router R1 in the form of packet 56 toward the router R3.

Generally, a router having its node degree larger tends to have the smaller number of hops to an address. In such a case where a routing protocol determining a next router only by the number of hops is used, packets in communication tend to intensively pass through a router having the number of hops smaller, in other words, having the node degree larger. Therefore, in a router where packets intensively pass, congestion tends to cause. Thus, in the conventional techniques, in order to avoid such congestion in a router having its node degree larger, the queue-waiting time in the neighboring router is taken into account to perform routing.

According to the configuration and operation described in this embodiment, however, since the router 10 performs routing based on the cost value calculated by the cost calculator 14, it is possible for a router not necessarily having the smallest number of hops to be selected as a subsequent next router. Thus, a router having its number of hops smaller and its node degree larger can be avoided so as to perform routing with a router avoid through which packets tend to intensively pass.

In addition, according to this illustrative embodiment, the node degrees of the neighboring routers can be used, of course, to attain the advantages similar to the conventional techniques in terms of avoiding a router tending to cause congestion. Since the frequency of change in the node degree of a router is smaller than that of the queue-waiting time, the frequency of transmitting information about the node degrees between the routers will also be reduced. This can also reduce the load on routers when processing packets notifying other routers of the node degrees. Compared with a routing technique of determining a next router only by the number of hops, the instant illustrative embodiment can lead to the total capacity of a network to increase for conveying the traffic of data.

Figure 6:
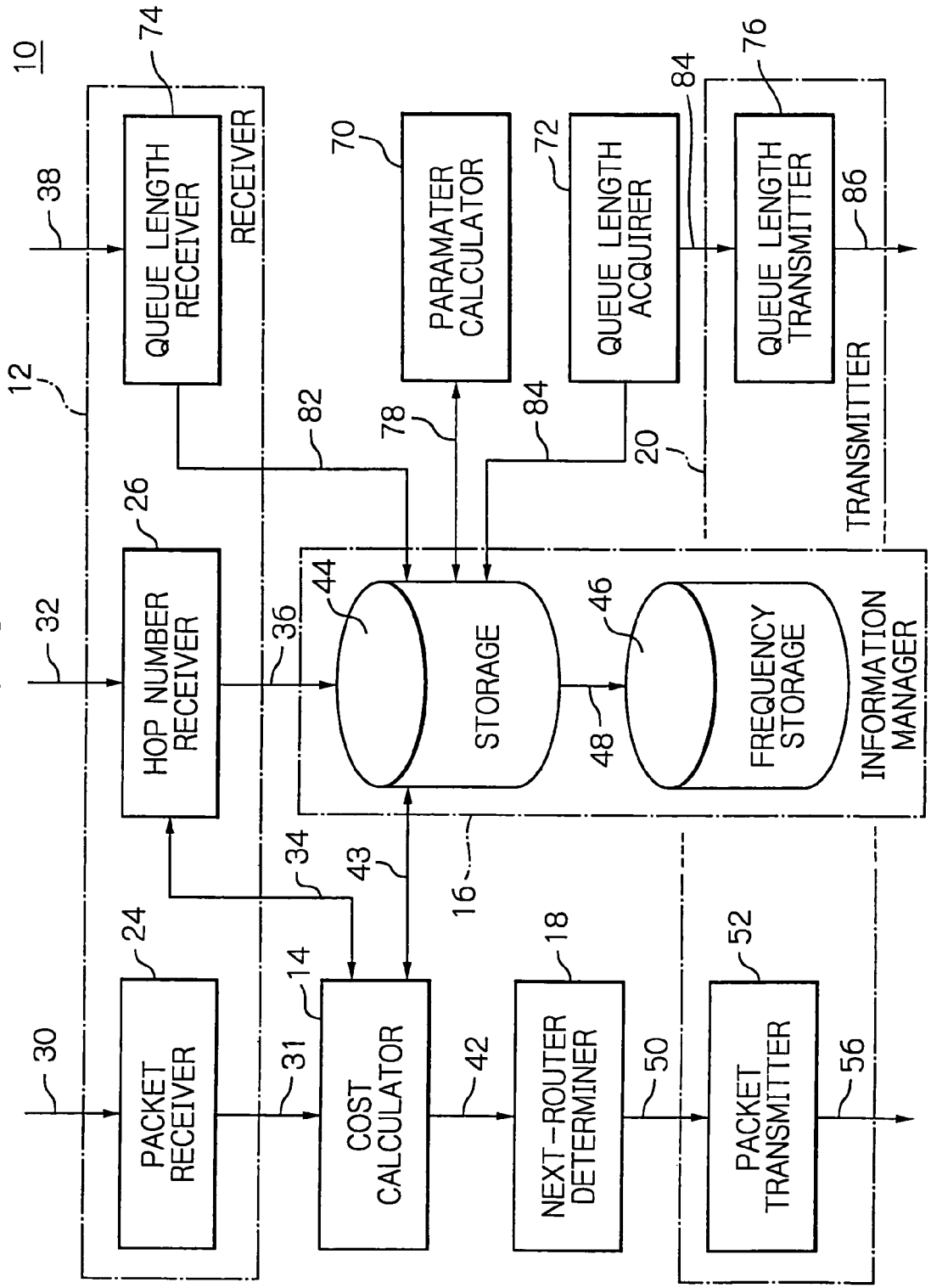
FIG. 6 is a schematic block diagram, like FIG. 1, showing the configuration of an alternative embodiment of a router to which a router device in accordance with the present invention is applied.

Well, with reference to FIG. 6, an alternative embodiment of the router 10 in accordance with the present invention will be described. In the previous embodiment, since the parameter α for calculation of the cost value $H_i$ of each neighboring router is constant as with the conventional techniques, the router 10 requires the optimum value of the parameter α to be preliminarily determined. In addition, as described in the above document, in order to determine the value of parameter α maximizing the total traffic volume of a network, the router 10 is also required to know the topology of the entire network.

The alternative embodiment is, however, even if the topology of the entire network is not known, configured and operated properly or adaptively to change the parameter α.

The router 10 in accordance with the alternative embodiment may be the same as the embodiment previously described with reference to and shown in FIG. 1 except that it includes a parameter calculator 70 and a queue length acquirer 72 in addition to the cost calculator 14, the information manager 16 and the next-router determiner 18. Further, the router 10 also includes the receiver 12 and the transmitter 20. The receiver 12 in the alternative embodiment includes the packet receiver 24, the hop number receiver 26, and a queue length receiver 74. The transmitter 20 in the alternative embodiment includes the packet transmitter 52 and a queue length transmitter 76. The receiver 12 is specifically featured by including the queue length receiver 74 instead of the degree receiver 28 in the previous embodiment. The transmitter 20 is featured by including the queue length transmitter 76 instead of the degree transmitter 54 in the previous embodiment. In the description, like components or constituent elements are denoted with the same reference numerals, and the repetitive descriptions will be avoided.

The parameter calculator 70 has a function to acquire the queue lengths of all the neighboring routers contained in the storage 44 and to calculate the parameter α through an expression (3) described below. The queue length is represented by the number of packets held in a queue to wait for being processed. The parameter α is calculated when information about the queue length contained in the storage 44 is updated. Specifically, in the router 10, the contents in the storage 44 are updated with either information 82 or 84 from the queue length receiver 74 or the queue length acquirer 72, respectively, and thereafter a signal 78 representing the completion of the update is delivered from the storage 44 to the parameter calculator 70. The parameter calculator 70 is in response to the signal 78 delivered to start to calculate the parameter α.

The parameter α is calculated through the expression (3):

$$\alpha = \frac{\sigma^2}{k + \sigma^2} \quad (3)$$

where k is an arbitrary positive constant, and $\sigma^2$ is the sample variance of the queue lengths of all the neighboring routers. The parameter α is in the range of $0 \leq \alpha < 1$. An increase in the sample variance of the queue lengths of the neighboring routers causes the parameter α to increase. The parameter calculator 70 transfers the calculated parameter α as data 78 to the storage 44.

The queue length receiver 74 has a function to receive from a neighboring router a notification of the queue length of that neighboring router. The queue length receiver 74 receives the queue length 80 of the neighboring router, and supplies the received queue length 80 as the received information 82 to the storage 44. The storage 44 stores the supplied queue length 82.

The storage 44 holds information about the queue lengths of the router 10 and of all the routers neighboring the router 10 and about the number of hops from the neighboring routers to a certain address or addresses. The cost calculator 14 uses an expression (4) described below to calculate the cost value $H_i$ of each neighboring router.

The queue length acquirer 72 has a function to acquire the queue length of the router 10. The queue length acquirer 72 feeds the acquired queue length 84 to the storage 44 and the queue length transmitter 76.

The queue length transmitter 76 has a function to send a notification of the queue length of the router 10 after updated. The queue length transmitter 76 sends, only when the queue length of the router 10 is updated, a notification of the queue length 86 of the router 10 after the update to the queue length receiver 74 in its neighboring routers.

The parameter calculator 70, the queue length acquirer 72, the queue length receiver 74 and the queue length transmitter 76 can be implemented in the form of hardware such as circuit devices having their functions, or alternatively in the form of functional blocks configured by arithmetic devices such as a microcomputer, or a CPU controlled by software defining its operation. The queue length receiver 74 and the queue length transmitter 76 may include appropriate network interfaces. These network interfaces may be shared between these functional units. Such network interfaces are exemplified by a router having the acquisition of queue length installed therein or an SNMP (Simple Network Management Protocol).

Next, it will be described how the cost calculator 14 calculates the cost value $H_i$ for each neighboring router i. (1) Acquisition of the queue length and the number of hops The cost calculator 14 first references the storage 44 to obtain the queue length 80 of its neighboring routers and the number of hops to the forwarding address for a packet 30 received by the packet receiver 24 for each of the neighboring routers except the previous router. For example, in FIG. 4A, the router R2 received the communication packet from the router R1. In this case, the previous router for the router R2 is the router R1. The previous router is excluded, similarly to the previous embodiment, in order to prevent the received packet from being returned to itself. If information about the number of hops cannot be acquired with reference to the storage 44, then the router 10 requests the hop number receiver 26 to obtain missing information about the number of hops. The router 10 acquires, through the hop number receiver 26, missing information 32 about the number of hops for the neighboring routers. The hop number receiver 26 delivers the information 34 about the number of hops to the cost calculator 14.

(2) Calculation of the Cost Value $H_i$

The cost calculator 14 acquires the information about the queue lengths and the numbers of hops for all the neighboring routers, and then calculates the cost value $H_i$ for each neighboring router through an expression (4):

$$H_i = \alpha \frac{Q_i}{\sum_{j \in g(s)} Q_j} + (1-\alpha) \frac{L_i}{\sum_{j \in g(s)} L_j}, \quad 0 \leq \alpha \leq 1 \quad (4)$$

where g(s) is a set of neighboring routers of a router s except a previous router, Q(i) is the queue length of a router i, and L(i) is the number of hops from a router i to a forwarding address. The cost calculator 14 uses the value calculated by the parameter calculator 70 for the parameter α in the expression (4) for the calculation. A "coefficient" in the alternative embodiment corresponds to the parameter α in the expression (4).

Figure 7A:
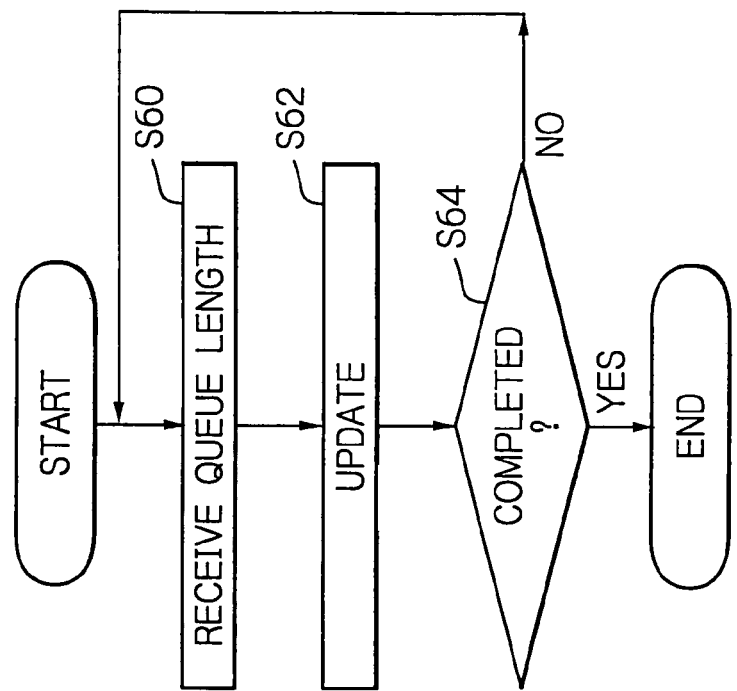
FIG. 7A is a flowchart useful for understanding a procedure of operation that the router shown in FIG. 6 acquires a queue length of the own router.
Figure 7B:
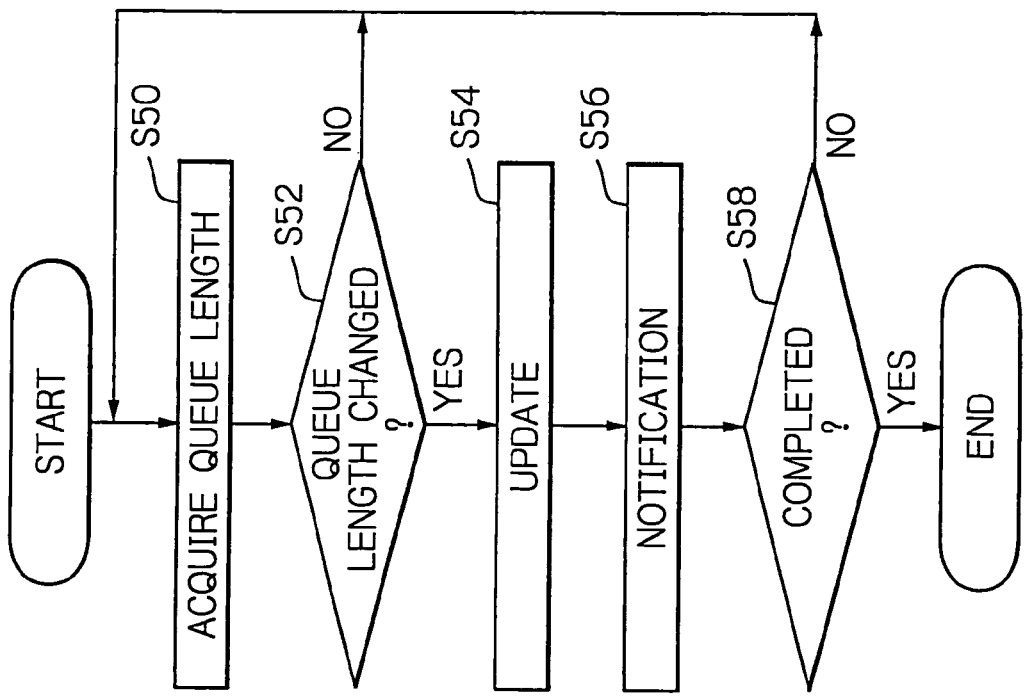
FIG. 7B is a flowchart useful for understanding a procedure of operation that the router shown in FIG. 6 acquires the queue length of the neighboring router.

Next, with reference to FIGS. 7A and 7B, the operation of the router 10 will be described in detail. FIG. 7A shows how the router 10 acquires the queue length of the own router 10, while FIG. 7B shows how the router 10 acquires the queue lengths of the neighboring routers.

(a) The Queue Length of the Own Router

The queue length acquirer 72 acquires the queue length of the own router 10 (step S50). Next, the queue length acquirer 72 confirms whether or not the newly acquired queue length 82 is changed to be different from the preceding queue length of the own router 10 contained in the storage 44 (step S52). When the queue length is determined as changed according to the difference (YES), the step progresses to an update step S54. Otherwise, namely, when the queue length is not determined as changed (NO), the step returns to the step S50 for acquiring the queue length.

Next, the queue length acquirer 72 supplies the acquired queue length 84 to the storage 44. In the storage 44, the preceding queue length of the own router 10 contained therein is updated with the newly supplied queue length 84 (step S54). The queue length acquirer 72 outputs the updated value 84 to the queue length transmitter 76. In turn, the queue length transmitter 76 notifies all the neighboring routers of the received updated queue length 86 of the own router 10 (step S56).

Next, in the step S58 of acquiring the queue length, it is determined whether or not is to be completed. When the acquisition process for the queue length is to be continued (NO), the control is transferred to the step S50 of acquiring the queue length. Otherwise, namely, when the acquisition process for the queue length is completed (YES), the acquisition of queue length is finished in the own router 10.

(b) The Queue Length of the Neighboring Router

The queue length receiver 74 receives a notification of the queue length 80 from the neighboring router (step S60). In turn, the queue length receiver 74 updates the preceding queue length of the neighboring router contained in the storage 44 with the new queue length 82 (step S62).

Then, it is determined whether or not the step S64 of acquiring the queue length to be completed. When the acquisition process for the queue length is to be continued (NO), the control returns to the step S60 for acquiring the queue length. Otherwise, namely, when the acquisition process for the queue length is completed (YES), the acquisition of queue length is finished in the own router 10.

Next, in terms of the same network configuration as shown in FIGS. 4A and 4B described on the previous embodiment shown in FIG. 1, a specific operation of the router 10 in accordance with the alternative embodiment will be described. Before and after the router R2 receives a notification of a change in the queue length from the router R4, it is shown in FIGS. 8A and 8B, respectively, how information is stored in the storage 44 of the router R2.

In the initial state, the storage 44 contains values shown in FIG. 8A. A queue length field 88 contains the queue length of each router. In the fields for the number of hops for each router, a router name field 90 contains a router name, a forwarding address field 92 contains a forwarding address, and a hop number field 94 contains the number of hops to the forwarding address. A parameter field 96 contains the parameter α for used in the expressions (3) and (4).

The parameter calculator 70 calculates the parameter a based on the information contained in the storage 44, storing the following values in the storage 44.

$$\sigma^2 = 6.5$$

$$\alpha = \sigma^2/(1.0+\sigma^2) = 0.87$$

Next, in the state shown in FIG. 8A, the router R2 receives a packet transmitted from the router R1 meant for the address "192.168.0.1". Now, the operation of forwarding a packet directed to the address "192.168.0.1" will be described in the following steps (1) to (4).

(1) The packet receiver 24 in the router R2 receives a packet the router R1 sent toward the address "192.168.0.1".

(2) The cost calculator 14 in the router R2 calculates the cost value $H_i$ of the respective neighboring routers except the router R1 serving as a previous router in the following steps.

(2.1) The cost calculator 14 acquires from the storage 44 the queue length and the number of hops required to the address "192.168.0.1" of each neighboring router.

(2.2) The cost calculator 14 uses the expression (4) and the values 43 acquired from the storage 44 to calculate the cost value $H_i$ of each neighboring router. In the alternative embodiment, the cost calculator 14 finds out the following values as exemplified.

(2.3) (Cost value $H_3$ of the router R3)=0.45
(2.4) (Cost value $H_4$ of the router R4)=0.16
(2.5) (Cost value $H_5$ of the router R5)=0.38

(3) The next-router determiner 18 in the router R2 uses the calculated cost value 42 of each neighboring router to select a next router for the packet received from the router R1. In the alternative embodiment, since the router R4 has the minimum cost value $H_4$ among the cost values $H_i$, the next-router determiner 18 in the router R2 selects the router R4 as the next router.

(4) The packet transmitter 52 forwards the packet received from the router R1 toward the router R4.

For example, when the router R2 receives from its neighboring router R4 a notification of the queue length changed to eight, the components of the router R2 will operate in the following steps (5) (6) and (7).

(5) The queue length receiver 74 in the router R2 receives the queue length 80 from the router R4. The acquisition process for the queue length by this receiving corresponds to the step S60 shown in FIG. 7B.

(6) The queue length receiver 74 in the router R2 updates the item "R4: 2" in the queue length field 88 shown in FIG. 8A to the item "R4: 8" shown in FIG. 8B according to the steps shown in FIG. 7B. in the router 10, after the contents in the storage 44 are updated with information 82 and 84 from the queue length receiver 74 and the queue length acquirer 72, respectively, a signal 78 representing the completion of the update is delivered from the storage 44 to the parameter calculator 70.

(7) The parameter calculator 70 is responsive to the update of the queue length of the router R4 to acquire data 78 of the queue length for each neighboring router contained in the storage 44 to recalculate the parameter α. In the alternative embodiment, the parameter calculator 70 finds out the following values.

$$\sigma^2 = 1.3$$

$$\alpha = \sigma^2/(1.0+\sigma^2) = 0.56$$

The values 78 of the recalculated parameter α are stored in the storage 44.

Next, in the state shown in FIG. 8B, it will be described how the respective elements operate when the router R2 again receives a packet sent from the router R1 meant for the address "192.168.0.1" to forward the packet toward the address "192.168.0.1" in the following steps (8) to (11).

(8) The packet receiver 24 in the router R2 receives a packet the router R1 sent toward the address "192.168.0.1".

(9) The cost calculator 14 in the router R2 calculates the cost value $H_i$ of the respective neighboring routers except the router R1 serving as a previous router in the following steps.

(9.1) The cost calculator 14 acquires from the storage 44 the queue length and the number of hops to the address "192.168.0.1" of each neighboring router.

(9.2) The cost calculator 14 uses the expression (4) and the values 43 acquired from the storage 44 to calculate the cost value $H_i$ of each neighboring router. In the alternative embodiment, the cost calculator 14 finds out the following values.
(9.3) (Cost value $H_3$ of the router R3)=0.28
(9.4) (Cost value $H_4$ of the router R4)=0.41
(9.5) (Cost value $H_5$ of the router R5)=0.32
(10) The next-router determiner 18 in the router R2 uses the calculated cost value 42 of each neighboring router to select a next router for the packet received from the router R1. In the alternative embodiment, since the router R3 has the minimum cost value $H_3$ among the cost values $H_i$, the next-router determiner 18 in the router R2 selects the router R3 as a next router.
(11) The packet transmitter 52 forwards the packet received from the router R1 toward the router R3.

In this way, as shown in FIGS. 8A and 8B, a change in the queue length of the router R4 from "2" to "8" leads to a decrease in the sample variance $\sigma^2$ of the queue lengths of the neighboring routers from 6.5 to 1.3. Accordingly, the calculated parameter $\alpha$ also decreases from 0.87 to 0.56. Therefore, due to a decrease in contribution of the queue length and an increase in contribution of the number of hops in the calculation for the cost value $H_i$, the next-router determiner 18 in the router R2 changes the next router to which the packet received from the router R1 is to be forwarded from the router R4 having its number of hops equal to ten hops required to the address "192.168.0.1" to the router R3 having its number of hops equal to three hops, which are minimum.

As described above, according to the alternative embodiment, the parameter $\alpha$ is dynamically changed or adaptively updated in response to the sample variance $\sigma^2$ of the queue lengths, thereby allowing the contribution of the queue length of the neighboring router in the routing to be changed. In the case of a larger variance of the queue lengths, the parameter $\alpha$ increases to lead to an increase in contribution of the queue length and a decrease in contribution of the number of hops in the calculation for the cost value $H_i$, so that a router having a shorter queue length tends to be selected as a next router to accomplish such routing as to avoid congestion.

In the case of a smaller variance of the queue lengths, the congestion level is in the same range between neighboring routers to the extent that the queue length of the neighboring routers does not need to be carefully considered. In view of the fact, the alternative embodiment is so structured that a decrease in the variance of the queue lengths of the neighboring routers leads to an increase in contribution of the number of hops in the expression (4) to perform routing with priority on the number of hops, thereby attaining an advantageous effect that received packets can reach the destinations earlier.

The two previous embodiments may be combined together in configuration and operation. For example, the router 10 may be modified so as to incorporate the feature of node order into the alternative embodiment to thereby acquire or receive the queue length, thereby performing routing with the frequency of updating information between routers reduced while variably setting the parameter $\alpha$ to increase the total traffic volume. In that case, the cost value $H_i$ can be calculated through the following algorism.
(1) The cost value $H_i$ is calculated through the expression (2). The queue length is used only for calculating the parameter $\alpha$.
(2) The cost value $H_i$ is calculated by, for example, averaging the values found by both expressions (2) and (4), thereby finding out the cost value in comprehensive consideration of the node degree, the queue length and the number of hops.

The illustrative embodiments described above are exemplified by the specific configurations and operation of the router 10. However, communication devices for routing can be implemented by generally applying a configuration similar to the router 10. For example, communication nodes forming a Peer-to-Peer network may be equipped with constituent elements similar to those of the illustrative embodiments to be operable so as to forward packets in the way similar to the embodiments.

The entire disclosure of Japanese patent application No. 2008-137841 filed on May 27, 2008, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A router device for forwarding a communication packet, comprising:
a receiver for receiving the communication packet meant for a communication destination other than said device;
a calculator for calculating a cost value for forwarding the communication packet meant for the destination by at least one neighboring router adjacent to said device for each of the at least one neighboring router; and
a next-router determiner operative in response to the cost value for selecting one of the at least one neighboring router acting as a next router for the communication packet,
said calculator using as parameters a node degree of the neighboring router and a number of hops from the neighboring router to the destination for the communication packet to calculate the cost value,
wherein said calculator uses, in addition to the parameters, a coefficient defining levels of contribution of the node degree and the number of hops to the cost value to calculate the cost value.

2. The device in accordance with claim 1, further comprising:
a degree receiver for receiving the node degree of the neighboring router from the neighboring router;
a degree acquirer for acquiring the node degree of said device; and
a storage for storing the node degree received by said degree receiver and the node degree acquired by said degree acquirer,
said calculator referring to the node degree stored in said storage to calculate the cost value.

3. A router device for forwarding a communication packet, comprising:
a receiver for receiving the communication packet meant for a communication destination other than said device;
a calculator for calculating a cost value for forwarding the communication packet meant for the destination by at least one neighboring router adjacent to said device for each of the at least one neighboring router; and
a next-router determiner operative in response to the cost value for selecting one of the at least one neighboring router acting as a next router for the communication packet,
said calculator using as parameters a queue length of packet in the neighboring router and a number of hops from the neighboring router to the destination for the communication packet to calculate the cost value, wherein said calculator uses, in addition to the set two parameters, a coefficient defining levels of contribution of the queue length and the number of hops to the cost value to calculate the cost value.

4. The device in accordance with claim 3, further comprising a parameter calculator for finding the coefficient through an expression using a sample variance of the queue length, the expression having a function to calculate the coefficient so that a decrease in the sample variance leads to a decrease in the levels of the contribution of the queue length.

5. The device in accordance with claim 3, further comprising:

a queue length receiver for receiving the queue length of the neighboring router from the neighboring router;

a queue length acquirer for acquiring the queue length of said device; and a storage for storing the queue length received by said queue length receiver and the queue length acquired by said queue length acquirer, said calculator referring to the queue length stored in said storage to calculate the cost value.

6. A router device for forwarding a communication packet, comprising:

a receiver for receiving the communication packet meant for a communication destination other than said device;

a calculator for calculating a cost value for forwarding the communication packet meant for the destination by at least one neighboring router adjacent to said device for each of the at least one neighboring router; and a next-router determiner operative in response to the cost value for selecting one of the at least one neighboring router acting as a next router for the communication packet, said calculator using as parameters a node degree of the at least one neighboring router and a number of hops from the neighboring router to the destination for the communication packet to calculate the cost value, wherein said node degree also includes a number of neighboring routers.

* * * * *